Patented Jan. 1, 1952

2,580,393

UNITED STATES PATENT OFFICE 2,580,393

ACRYLONITRILE POLYMER COMPOSITIONS

Ralph Gardner Beaman, Buffalo, N. Y., assignor to E. I. du Pont de Nemours & Company, Wilmington, Del., a corporation of Delaware No Drawing. Application August 9, 1949, Serial No. 109,403

11 Claims. (Cl. 260—30.4)

This invention relates to new compositions of matter and shaped articles produced therefrom. More particularly, this invention relates to organic solvent solutions of polyacrylonitrile, i. e. polymerized acrylonitrile or polymerized vinyl cyanide and copolymers and interpolymers of acrylonitrile in which at least 85% by weight of the polymer is acrylonitrile and to the production of shaped articles from said solutions of said polymers.

Polyacrylonitrile and copolymers and interpolymers of acrylonitrile with other polymerizable substances, for example, vinyl or acrylic compounds, in which at least 85% by weight of the polymer is acrylonitrile, have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

A number of solvents have been found for polyacrylonitriles as exemplified in U. S. Patents 2,404,714–2,404,727. However, in striving for the production of high quality products, such as a high quality yarn, it has been found that many of the known solvents have disadvantages even though they are effective and useful solvents. For example, the use of dimethyl formamide, which is an excellent and useful solvent, leads, in dry spinning techniques, to the production of colored articles and means, such as stabilizing or bleaching, are required to produce articles free from undesirable color. Similarly, such a solvent as N,N-dimethylmethoxyacetamide is expensive and somewhat higher boiling than is desired for economic dry spinning procedures. Further, most apparently excellent solvents in other respects do not give good spinnability or proper attenuability for high speed melt spinning.

It is, therefore, an object of this invention to dissolve polyacrylonitrile or a copolymer or interpolymer of acrylonitrile in which at least 85% by weight of the polymer is acrylonitrile in a solvent which does not react with or decompose or discolor the polymer and which may be substantially completely removed at relatively low temperatures from the structures formed of such a solution.

It is another object of this invention to produce a solution of polyacrylonitrile or a copolymer or interpolymer of acrylonitrile in which at least 85% by weight of the polymer is acrylonitrile in a solvent which does not react with or decompose or discolor the polymer, the solution being suitable for the formation of commercially useful, void free articles of polyacrylonitrile, for example yarns which are suitable as textile yarns and films which are suitable as wrapping tissues.

It is another object of this invention to produce a solution of polyacrylonitrile, or a copolymer or interpolymer of acrylonitrile in which at least 85% by weight of the polymer is acrylonitrile in an organic solvent which solution is stable over extended periods of time and is eminently suited for use in the manufacture of shaped articles such as yarns, films, tubes, straws. artificial horsehair, bristles and ribbons, or when highly concentrated, for use in the manufacture of molded articles.

It is a still further object of this invention to produce shaped articles and structures of polyacrylonitrile or copolymers or interpolymers of acrylonitrile in which at least 85% by weight of the polymer is acrylonitrile.

It is another object of this invention to produce a shaped article or structure of polyacrylonitrile or copolymers or interpolymers of acrylonitrile in which at least 85% by weight of the polymer is acrylonitrile for example, a yarn, film, tube, bristle or the like which is tough, flexible, tenacious and free from voids. It is also the object of this invention to produce acrylonitrile polymer compositions which may readily be melt spun.

Other objects of the invention will appear hereinafter.

The objects of this invention are accomplished in general by dissolving polyacrylonitrile or copolymers or interpolymers of acrylonitrile in which at least 85% by weight of the polymer is acrylonitrile in a solvent selected from the group consisting of N-acetyl morpholine, N-acetyl pyrrolidine, N,N'-diacetyl-N.N'-dimethylhydrazine, N,N' - diacetyl - N,N'-dimethylmethylenediamine, N,N' - diacetyl - N,N' - dimethylethylenediamine and N,N'-diacetyl piperazine.

The following examples in which parts, proportions and percentages are by weight illustrate applications of the principles of the invention.

*Example I*

Ten parts of polyacrylonitrile were mixed with 90 parts of each compound given below and heated with stirring to give clear, viscous solutions.

Tough films were cast by coagulation and solvent removal with water.

N-acetyl morpholine
N-acetyl pyrrolidine
N,N'-diacetyl-N,N'-dimethylhydrazine
N,N'-diacetyl-N,N'-dimethylmethylenediamine
N,N'-diacetyl-N,N'-dimethylethylenediamine
N,N'-diacetyl piperazine

Example II

Five parts of each of the copolymers of acrylonitrile given below were mixed with 95 parts of N-acetyl morpholine. The mixtures were then heated with stirring to give solutions.

| Comonomers | Proportions |
|---|---|
| Styrene | 95/5 |
| Dimethyl itaconate | 95/5 |
| Methyl vinyl ketone | 95/5 |
| 2-vinyl pyridine | 95/5 |
| Ethyl vinyl sulfone | 90/10 |
| Methacrylonitrile | 90/10 |
| Isobutylene | 90/10 |

In the same way solutions were obtained using these copolymers and the other solvents given in Example I. In all cases shaped articles, such as films, were readily obtained as in Example I.

Example III

Fifty-three parts of a polymer of acrylonitrile and 2-vinyl pyridine (95%/5% and 1.43 intrinsic viscosity and about 50,000 molecular weight) was ground to pass 200 mesh screen and 47 parts of N-acetyl morpholine was added to form a paste. This was mixed in a Banbury mixer for 20 minutes at 65° C. to 105° C. Several batches of the mix were used in a melt spinning process which involved placing the mix in a cylinder and forcing it through a spinneret by means of a piston. The cylinder was heated and a metering pump was employed to feed the heated mix to the spinneret. The spinneret was of stainless steel with 5 holes 0.016 inch in diameter and it was placed vertically downward toward a traversed windup bobbin 4 feet below.

With the melt heated to 145° C. in the cylinder, the pump and spinneret to 165° C. and with a pump delivery of 2.5 grams per minute per spinneret hole, yarn was wound on the bobbin at a speed of 600 yards per minute. This yarn was washed on the bobbin in water at room temperature until free of N-acetyl morpholine. It was then drawn by passing thru atmospheric pressure steam to 2.5× its initial length. The drawn dried yarn had good appearance and physical properties of 1.4 grams per denier, 19% elongation and a modulus of 66 grams per denier.

In another run a similar mixture was fed into a "Millstruder" screw mixer-extruder at 160° C. and extruded as a translucent cylindrical rod. This was broken into small pieces and fed into a screw extruder at 170° C. and forced through a spinneret (5 hole, 0.025 in.) at 205° C. The yarn, wound at 570 yards/min., after drawing 2.7× had a denier of 10.5 per filament, a tenacity of 2.3 grams, an elongation of 26% and a modulus of 45 grams per denier.

N-acetyl morpholine is an excellent plasticizer for melt spinning of acrylonitrile polymers. It is stable and hence much superior to ethylene carbonate. It does not degrade the polymers during mixing as does N,N-dimethylforamide. It produces a much more "spinnable" melt than butyrolactone. It is less subject to heat decomposition itself than tetramethylene cyclic sulfone (i. e. the pure solvent darkens less readily on heating or standing) and gives whiter yarn than the sulfone.

The solvents of this invention are amides and specifically are amides of acetic acid with secondary amines. The secondary amines are piperazine, pyrrolidine, morpholine, N,N'-dimethylhydrazine, N,N' - dimethylmethylenediamine and N,N'-dimethylethylenediamine. The solvents of this invention are excellent solvents for both acrylonitrile homopolymers and for copolymers or interpolymers of acrylonitrile.

The polymers and copolymers of acrylonitrile for use in this invention can be prepared in any suitable manner such as those methods disclosed in U. S. Patent 2,160,054 or in U. S. Patents 2,404,714–2,404,727. The invention comprehends dissolving of acrylonitrile homopolymers and copolymers and interpolymers in which acrylonitrile is polymerized with other polymerizable substances such as, for example, compounds containing 1 or more ethylenic linkages which may include vinyl acetate, vinyl chloride, isobutylene and butadiene, styrene, dimethyl itaconate, methylvinyl ketone, ethylvinyl sulfone, methacrylonitrile, acrylic and vinyl pyridines, such as 2-vinyl pyridine. The solvents of this invention are eminently satisfactory for use with those polymers which contain a large amount of acrylonitrile, for example, polymers that contain in the polymer molecule at least 85% by weight of acrylonitrile. The solvent may be used in forming useful compositions with polymers having an average molecular weight between 15,000 and 250,000 as determined by viscosity data using the Staudinger equation. Such polymers are generally used in the manufacture of yarns and filaments. Generally, polymers having a molecular weight between 40,000 and 150,000 are preferred.

The above described solutions of the acrylonitrile polymers may be shaped in the form of filaments, yarns, films, tubes and like structures by apparatus and processes generally known in the art, the detailed operating conditions being suitably modified. The solutions are stable at low temperatures and at elevated temperatures and may be used in producing shaped articles by extruding these solutions into a coagulating medium or by melt spinning solutions of high solid content. Film formation is readily achieved by casting the solution onto a smooth surface such as an endless steel band under the smoothing action of a doctor knife. The solvent may be removed preferably by the wet method which utilizes a liquid coagulating bath. Similarly, the solutions, may be used in the manufacture of moulded articles or as lacquer or coating compositions, these being especially useful in the coating of wire and electrical parts where high chemical and electrical resistance is important. In the preparation of shaped articles, solutions having a viscosity of from about 25 to 750 poises are preferred.

In addition to acting as solvents the solvents of this invention can also be used as plasticizing agents when present in small amounts. Non-solvent softeners such as glycerol may also be incorporated.

In preparing the compositions of this invention small amounts of the solvent may be used, as, for example, 40% to 65% to produce compositions suitable for melt spinning. Smaller amounts, such as 5% to 40% or more, may be employed to produce compositions useful in obtaining molded articles. In producing solutions for wet spinning the amount of solvent ranges preferably from 75% to 90%.

Although the solvents of this invention do not dissolve the polymers readily at room temperature they are effective at somewhat higher temperatures, as, for example, at 50° C. or higher. Since N,N'-diacetyl piperazine and N,N'-diacetyl-N,N'-dimethylethylenediamine are solids at room temperature, it is necessary to heat them above their melting points. The solutions, once formed, with N-acetyl morpholine and N-acetyl pyrrolidine are stable at room temperature for extended periods of time, however.

The stability of these solvents is much greater than previously possessed by most known solvents in all regards especially in regard to color formation brought about by metal salts or by the development of impurities in the solvent at elevated temperatures. There is less adverse color formation and less degradation of the polymer in solutions of this invention than in solutions of the polymers in such a solvent as N,N-dimethylformamide. These solvents are eminently suited for use in melt spinning because of their excellent solvent power and unusual stability. The possibilities for the commercialization of acrylonitrile polymers containing at least 85% acrylonitrile are decidedly enhanced by this invention.

The compositions of this invention may be used to produce the following:

Outdoor uses—
Auto tops
Balloon fabric
Belts for combines
Fire hose covers
Horse harness
Harvester aprons
Lawn mower baskets
Life belts and preservers
Mosquito netting
Rainwear
Outdoor sewing thread
Sporting equipment
Hammocks
Sea bags Flat fabrics—
Crepe fabrics
Airplane head rest
Diaphragms
Lamination
Leader cloths
RR canvas
Shower curtains
Tracing cloth
Varnished thread
Varnished silk
Curtains
Shades
Ventubes (mining)
Lampshades
Bookbinding
Cloth top sport shoes
Camera bellows
Sacking
Tapestry
Mattress covers Staple—
Blankets
Paper makers felt
"Felt base" linoleum Miscellaneous—
Laundry net
Braided thread
Cable braid
Tablecloths Tapes—
Zipper
Electrical
Venetian blind tapes
Watch straps Rubber covered—
Coated diaphragms
Conveyor belt It was not expected that the solvents of this invention would be solvents in view of U. S. 2,404,714 and U. S. 2,404,719 which pointed out that only formyl derivatives of secondary amines would be solvents, except for dibasic acid derivatives in which case only derivatives of dimethylamine were operative. The solvents of this invention are acetyl derivatives and furthermore are derivatives of amines other than dimethylamine. Further, closely related compounds are ineffective. For example, N,N-diethylacetamide, N,N-diethylformamide and N-acetyl piperidine are non-solvents for polyacrylonitrile. The polymers of this invention possessing the aforesaid properties not possessed by other polymers require specific, unusual solvents.

Any departure from the procedure described herein which conforms to the principles of the invention is intended to be included within the scope of the claims below.

I claim:

1. A new composition of matter comprising a member of the group consisting of N-acetyl morpholine, N-acetyl pyrrolidine, N,N'-diacetyl-N,N'-dimethylhydrazine, N,N'-diacetyl-N,N'-dimethylmethylenediamine, N,N'-diacetyl-N,N'-dimethylethylenediamine and N,N'-diacetyl piperazine and a polymer of acrylonitrile containing in the polymer molecule at least 85% by weight of acrylonitrile.

2. A new composition of matter comprising a polymer of acrylonitrile containing in the polymer molecule at least 85% by weight of acrylonitrile dissolved in a member of the group consisting of N-acetyl morpholine, N-acetyl pyrrolidine, N,N'-diacetyl-N,N'-dimethylhydrazine, N,N'-diacetyl-N,N'-dimethylmethylenediamine, N,N'-diacetyl-N,N'-dimethylethylenediamine and N,N'-diacetyl piperazine.

3. A new composition of matter comprising polyacrylonitrile dissolved in N-acetyl morpholine.

4. A composition of claim 2 characterized in that the polymer has a molecular weight of between 15,000 and 250,000.

5. A composition of claim 2 characterized in that the polymer has a molecular weight of between 40,000 and 150,000.

6. A composition of claim 2 characterized in that the solution contains at least 10% of the polymer.

7. A composition of claim 2 characterized in that the solution has a viscosity within the range of 25 to 750 poises.

8. A composition of claim 2 characterized in that the polymer of acrylonitrile is polyacrylonitrile having a molecular weight of between 15,000 and 250,000.

9. A composition of claim 2 characterized in that the polymer of acrylonitrile is polyacrylonitrile having a molecular weight of between 40,000 and 150,000.

10. A composition of claim 2 in which said polymer is a copolymer of acrylonitrile and a vinyl pyridine.

11. A composition of claim 2 in which said polymer is a copolymer of acrylonitrile and 2-vinylpyridine.

RALPH GARDNER BEAMAN.

REFERENCES CITED

The following references are of record in the file of this patent:

UNITED STATES PATENTS

| Number | Name | Date |
|---|---|---|
| 1,986,854 | Reid | Jan. 8, 1935 |
| 2,404,719 | Houtz | July 23, 1946 |